(12) United States Patent
Kuntze et al.

(10) Patent No.: US 12,735,118 B2
(45) Date of Patent: Sep. 15, 2026

(54) BONDING STRUCTURE EFFICIENTLY

(71) Applicant: Magna Exteriors Inc., Aurora (CA)

(72) Inventors: Christopher J. Kuntze, Goodrich, MI (US); Stanislav Tichy, Troy, MI (US); Yao Wang, Troy, MI (US); Mahesh Chakorkar, Katraj (IN); Tejaswi Vemuri, Shelby Township, MI (US)

(73) Assignee: Magna Exteriors Inc., Aurora (CA)

( * ) Notice: Subject to any disclaimer, the term of this patent is extended or adjusted under 35 U.S.C. 154(b) by 306 days.

(21) Appl. No.: 18/687,174

(22) PCT Filed: Sep. 6, 2022

(86) PCT No.: PCT/US2022/042628
§ 371 (c)(1),
(2) Date: Feb. 27, 2024

(87) PCT Pub. No.: WO2023/034634
PCT Pub. Date: Mar. 9, 2023

(65) Prior Publication Data

US 2024/0367727 A1 Nov. 7, 2024

Related U.S. Application Data

(60) Provisional application No. 63/240,516, filed on Sep. 3, 2021.

(51) Int. Cl.

| | |
|---|---|
| ***B62D 27/00*** | (2006.01) |
| ***B62D 27/02*** | (2006.01) |
| ***B62D 29/00*** | (2006.01) |

(52) U.S. Cl.
CPC ......... *B62D 27/026* (2013.01); *B62D 29/005* (2013.01)

(58) Field of Classification Search
CPC ............................ B62D 27/026; B62D 29/005
USPC .......................................................... 296/191
See application file for complete search history.

(56) References Cited

U.S. PATENT DOCUMENTS

| | | | | |
|---|---|---|---|---|
| 9,623,731 | B2 | 4/2017 | Ikeda et al. | |
| 2019/0322055 | A1* | 10/2019 | Okoli | B62D 29/046 |

FOREIGN PATENT DOCUMENTS

| | | | | |
|---|---|---|---|---|
| JP | 2014205491 A | 4/2017 | | |
| JP | 2019162920 A * | 9/2019 | | B62D 29/00 |
| WO | 2006094042 A1 | 9/2006 | | |
| WO | WO-2010128064 A1 * | 11/2010 | | B62D 21/09 |

OTHER PUBLICATIONS

International Search Report for PCT/US2022/042628 mailed Dec. 2, 2022, 2-pages.

* cited by examiner

*Primary Examiner* — Steven O Douglas

(57) ABSTRACT

A liftgate incorporating metallic reinforcements with predetermined flanges, openings, notches, slots, holes, steps, and/or adhesive gaps in predetermined strategic locations that allow extra adhesive applied to the outer panels or glass that will allow the adhesive to flow around and through the metallic reinforcements, and thus allowing them to be bonded to the mating panels. from multiple sides. The adhesive is also mechanically captured through the openings, holes, slots, and even into undercut pockets in the mating parts.

19 Claims, 13 Drawing Sheets

132

110

112

BONDING STRUCTURE EFFICIENTLY

CROSS-REFERENCE TO RELATED APPLICATIONS

This application is a National Stage of PCT International Patent Application No. PCT/US2022/042628, filed Sep. 6, 2022 and claims the benefit of U.S. Provisional Patent Application No. 63/240,516, filed Sep. 3, 2021. The disclosures of the above applications are incorporated herein by reference.

FIELD OF THE INVENTION

The present invention relates to bonding structure efficiently, such as with thermoplastic liftgates.

BACKGROUND OF THE INVENTION

Known problems with secondary bonding of metallic reinforcements include that it adds extra manufacturing operations, and this adds equipment, material, time, and costs. Other products have attempted to solve the problems with secondary bonding, overmolding, mechanical fasteners, which are disadvantageous.

Accordingly, there exists a need to bond metallic reinforcements without adding secondary bonding equipment and without adding any significant costs.

SUMMARY OF THE INVENTION

The present invention incorporates providing adhesive and operably squeezing it around and through the metallic structure with the primary bonding process incorporating thermoplastic.

Metallic reinforcements in accordance with the present invention have features that allow extra adhesive that is applied to a first panel to flow around and through the metallic reinforcements to allow bonding to one or more mating panels. At least one, preferably a plurality, of metallic reinforcements have at least one, preferably a plurality of, flanges, tabs, openings, notches, slots, apertures, holes, steps, adhesive gaps in predetermined strategic locations that will allow extra adhesive applied to at least one first panel (e.g., outer panel(s) and/or glass) that will allow the adhesive to flow around and through at least one metallic reinforcement, and thus allowing the at least one metallic reinforcement to be bonded to at least one mating panel, e.g., from multiple sides. The adhesive will also be mechanically captured through the openings, holes, slots, etc. of the metallic reinforcements and even into undercut pockets in the mating parts.

In accordance with aspects of the present invention, adhesive is first applied to at least one first panel (e.g., outer panel), and then when loading parts together (e.g., mold, jig, etc.), the adhesive flows and allows the metallic reinforcements to bond to the first and second panels (e.g., outer and inner panels), thus adding structure without adding extra operations. The adhesive will also be mechanically captured through the apertures, openings, holes, slots, etc. and even into undercut pockets in the mating parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
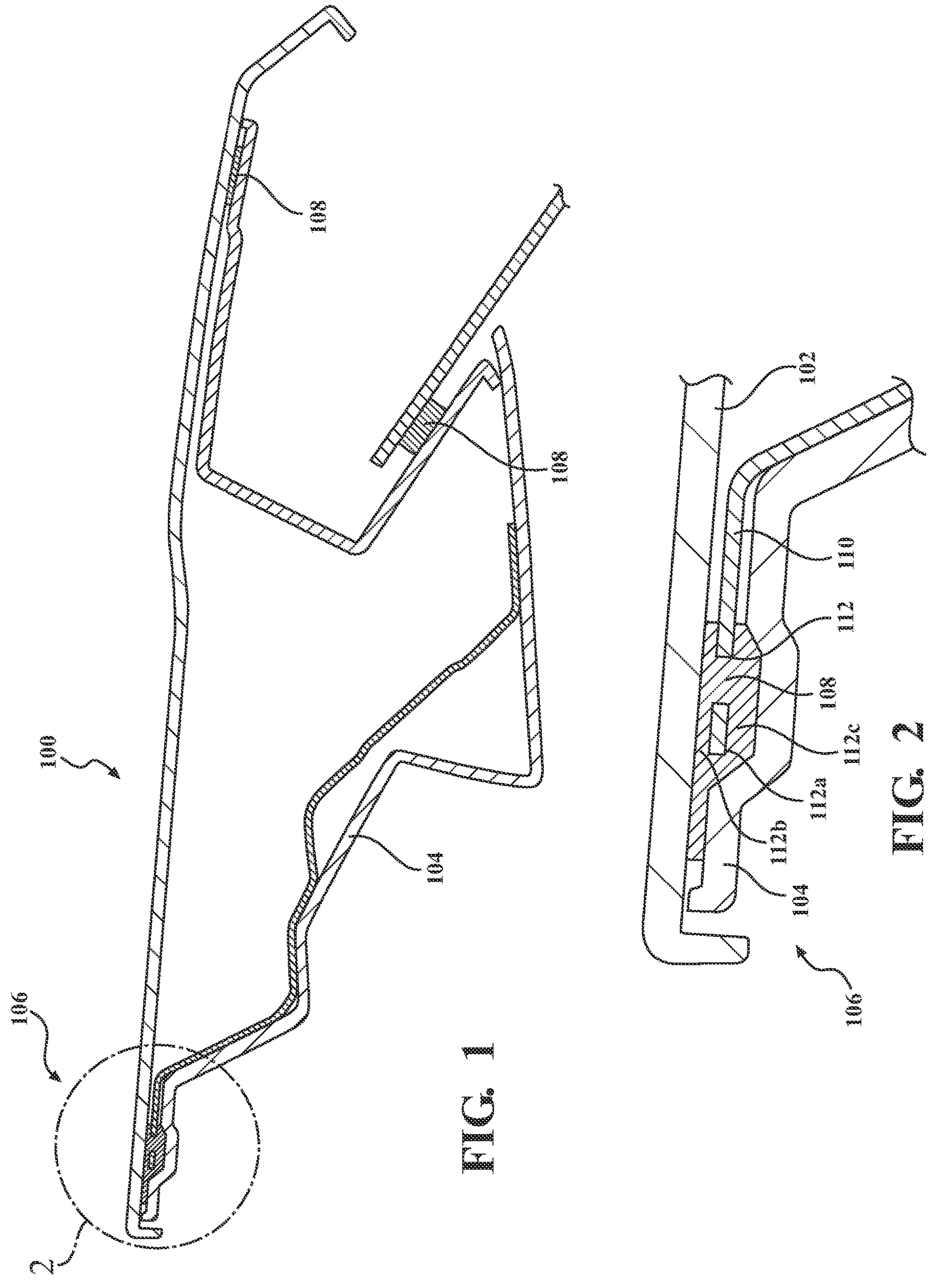
FIG. 1 is a cross section taken from part of an exemplary liftgate depicting reinforcements bonded to a first panel and a second panel, in accordance with the present invention.
FIG. 2 is an enlarged cross section taken of FIG. 1 at a header area, in accordance with the present invention.

The following description of the preferred embodiment(s) is merely exemplary in nature and is in no way intended to limit the invention, its application, or uses.

Referring to FIGS. 1-5 generally, there is depicted an exemplary liftgate 100 including at least a first panel 102 (e.g., outer panel) bonded to at least a second panel 104 (e.g., inner panel). An enlarged cross section illustrating an exemplary header area is shown generally at 106. Adhesive 108 bonds at least one reinforcement 110 (e.g., metallic reinforcement, header or D-pillar reinforcement) to at least the first panel 102 and second panel 104. A plurality of predetermined shaped and located apertures 112 are provided in the reinforcement 112 for the adhesive. The reinforcement 110 may also include a shape and placement with respect to the panels or other parts that allows adhesive to move around at least one edge 112*a* or any other predetermined alternative feature of the reinforcement 112 (flanges, edges, etc.) and into pockets, preferably at least two pockets 112*b*, 112*c* (e.g., below or above the reinforcement 110), matting to the outer and inner panels.

The at least one first panel and at least one second panel are preferably thermoplastic.

Figure 3:
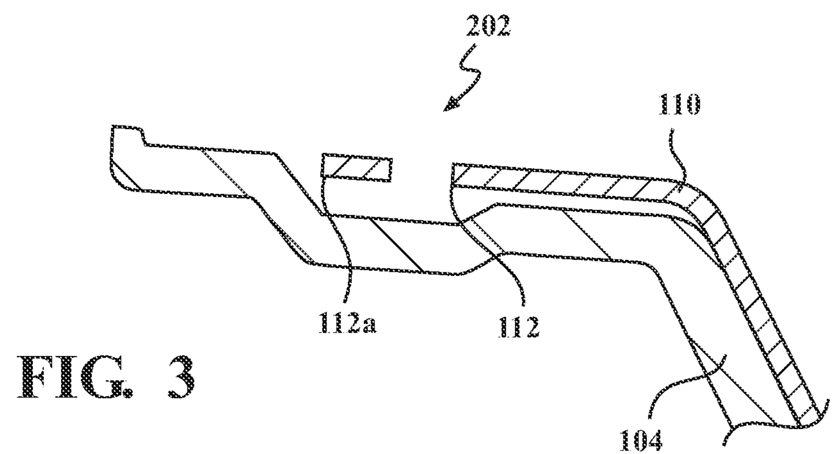
FIGS. 3-5 are cross sections depicting structure of FIG. 2 and exemplifying steps of manufacturing the reinforcements bonded to the first and second panel, in accordance with aspects of the present invention.
Figure 4:
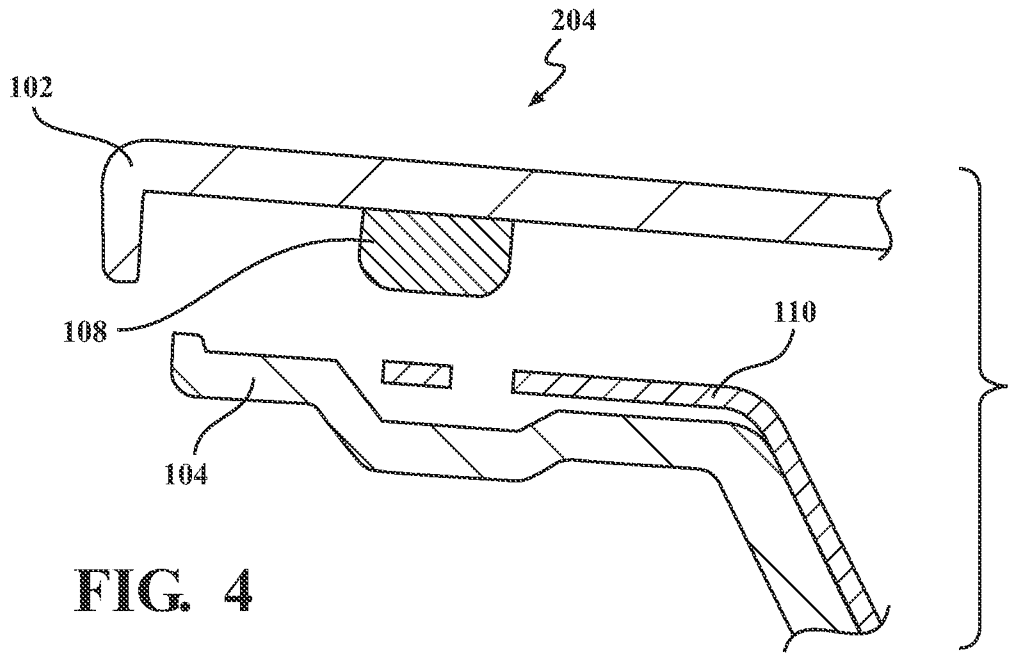
Figure 5:
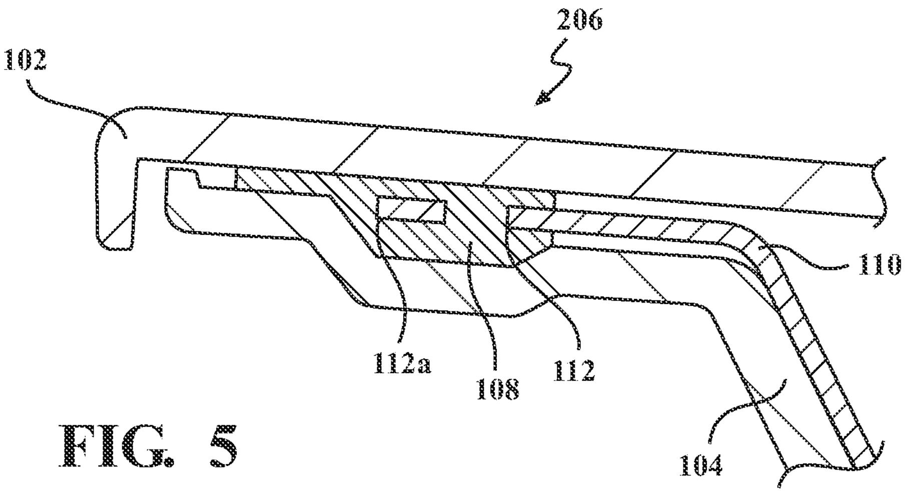

Referring more particularly to FIGS. 3-5, in accordance with an aspect of the present invention, there is provided a method of bonding metallic reinforcements to panels. It is understood that alternative steps and parts are contemplated depending on the application without departure from the scope of the present invention.

At step 202, the at least one second panel 104 (e.g., inner panel) and at least on reinforcement 110 (e.g., D-pillar reinforcement) are provided and placed relative to each other. The reinforcement 110, e.g., metallic reinforcement, has the at least one aperture 112, preferably a plurality of apertures 112. At step 204, at least one adhesive bead 108 is provide, preferably, a plurality of adhesive beads, on the at least one first panel 102 (e.g., outer panel) at predetermined location(s). Preferably, a bead of adhesive 108 operable to be aligned with each respective aperture 112. The first panel 102 is brought into alignment with the reinforcement 110 such that the adhesive 108 is aligned to the aperture 112. At step 206, the panels 102, 104 are brought toward each other for bonding (loaded, gravity, pressing, etc.). With the adhesive 108 applied to the first panel 102, when loading parts together, the adhesive 108 flows and allows the metallic reinforcements 110 to bond to the first and second panels 102, 104, thus adding structure without adding extra operations. The adhesive 108 will also be mechanically captured through the apertures 112 (e.g., openings, holes, slots), and can be even around the edge 112*a* and even into undercut pockets 112*b* and/or 112*c* in the mating part. The adhesive is operably cured, according to aspects of the present invention (e.g., at ambient temperature, heat, moisture, light, or combinations thereof, most preferably, curing at room temperature). A predetermined force (e.g., predetermined compression, gravity, etc.) can be applied to further facilitate predetermined adhesive movement and bonding the first and second panels to the reinforcement with the adhesive.

Figures 6, 7:
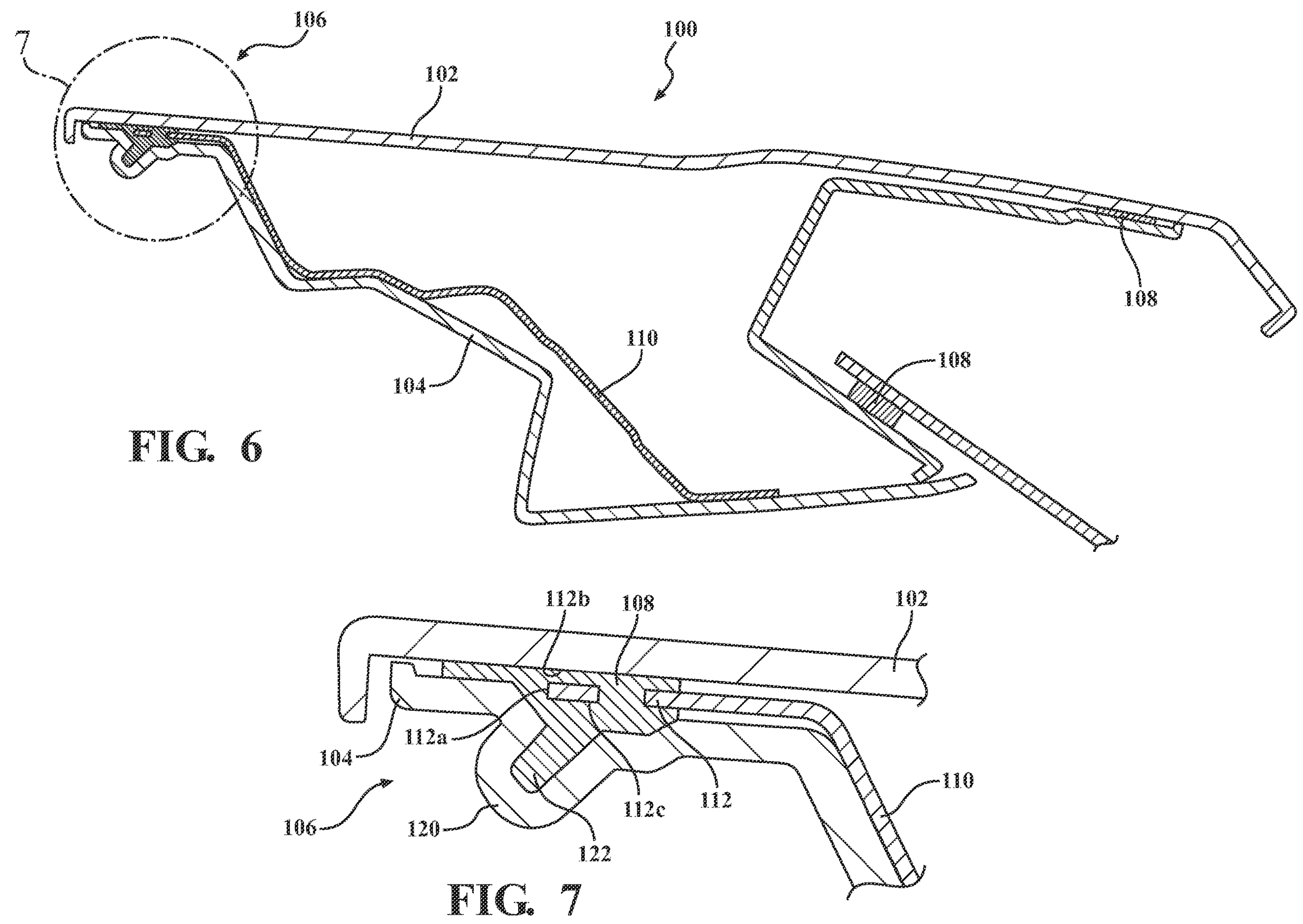
FIG. 6 is a cross section taken from part of an exemplary liftgate depicting reinforcements bonded to a first panel and a second panel, in accordance with the present invention.
FIG. 7 is an enlarged cross section taken of FIG. 6 at a header area, in accordance with the present invention.
Figures 8, 9:
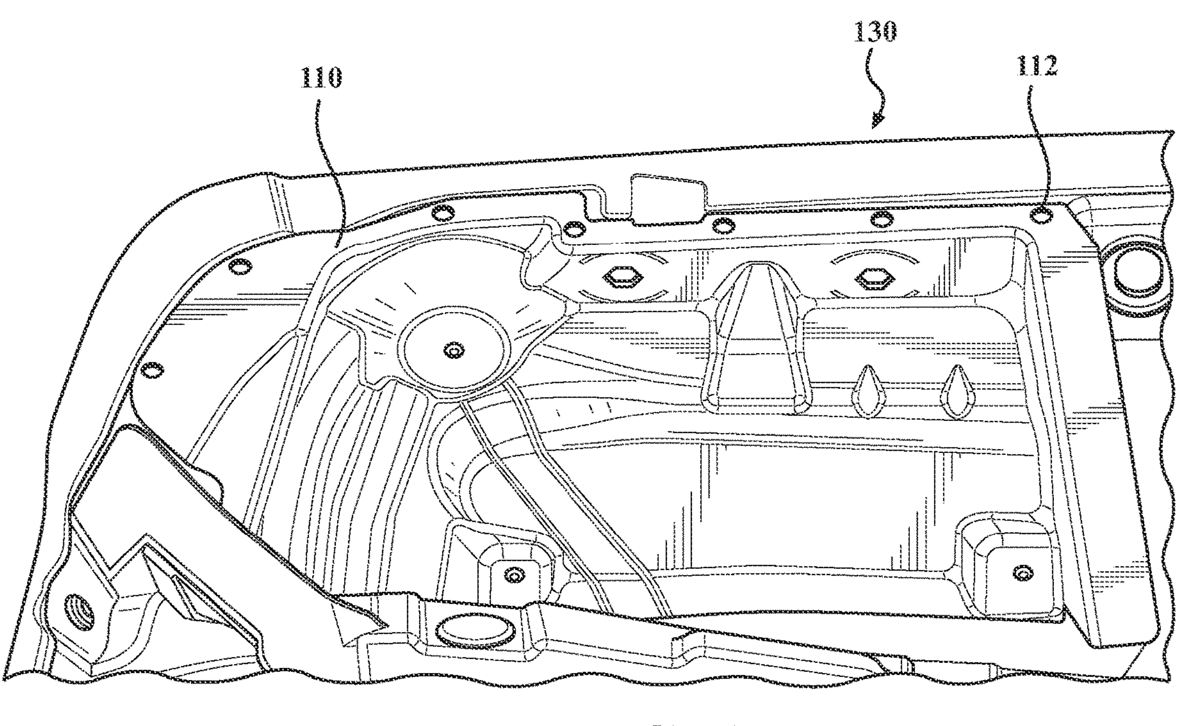
FIGS. 8-14 are exemplary apertures and patterns for reinforcements and bonding, in accordance with the present invention.
Figure 10:
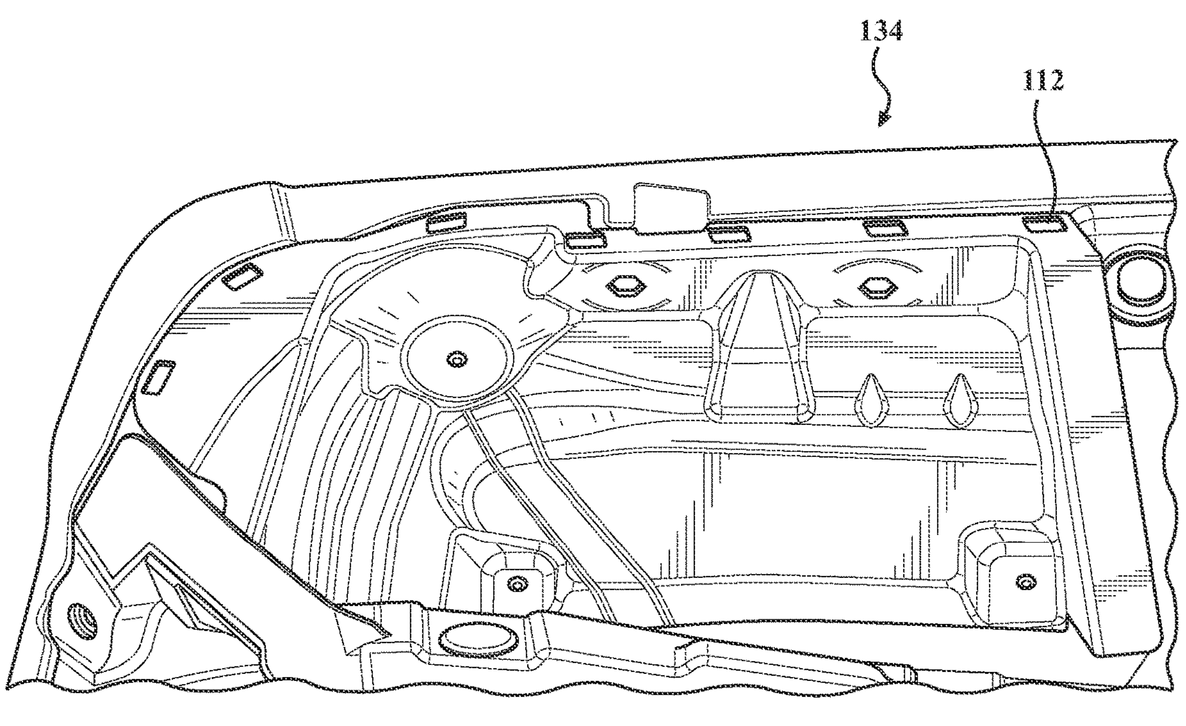
Figure 11:
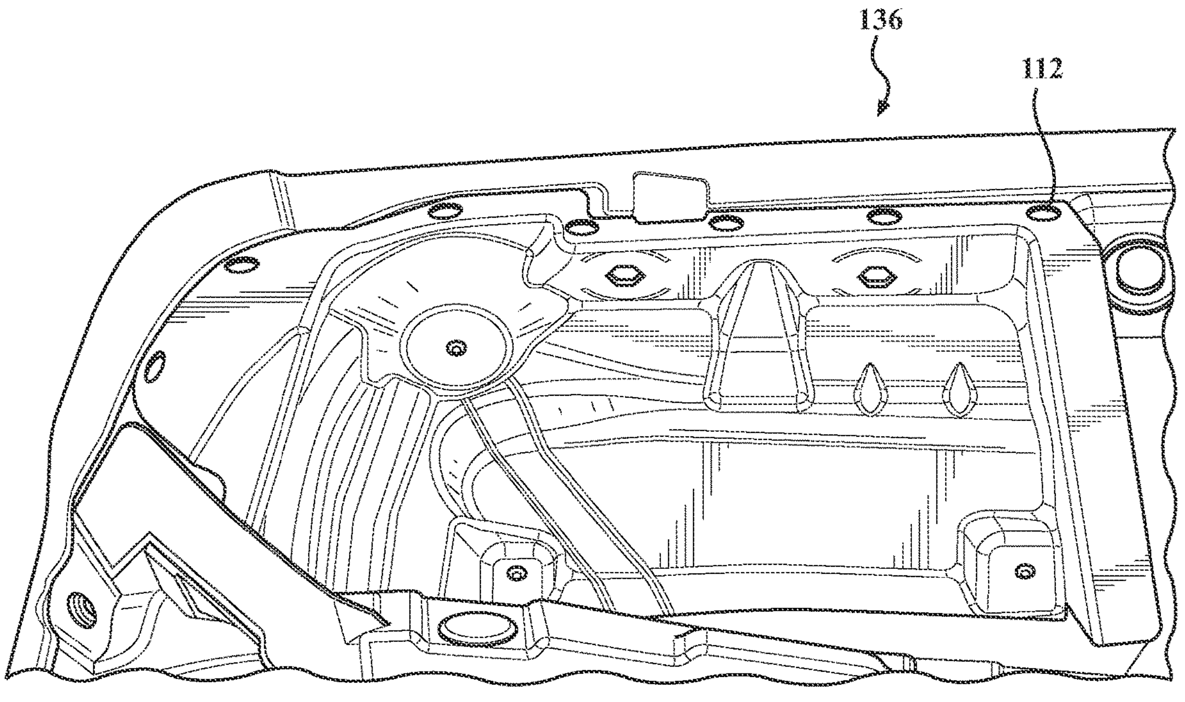
Figure 12:
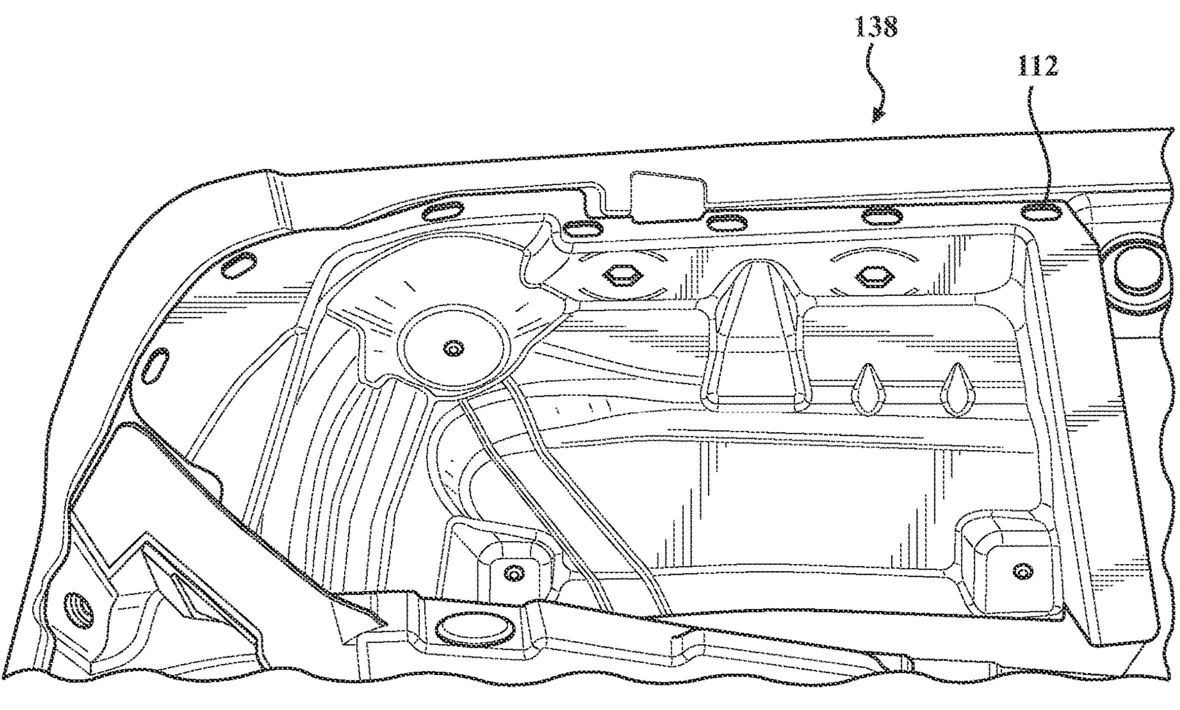
Figure 13:
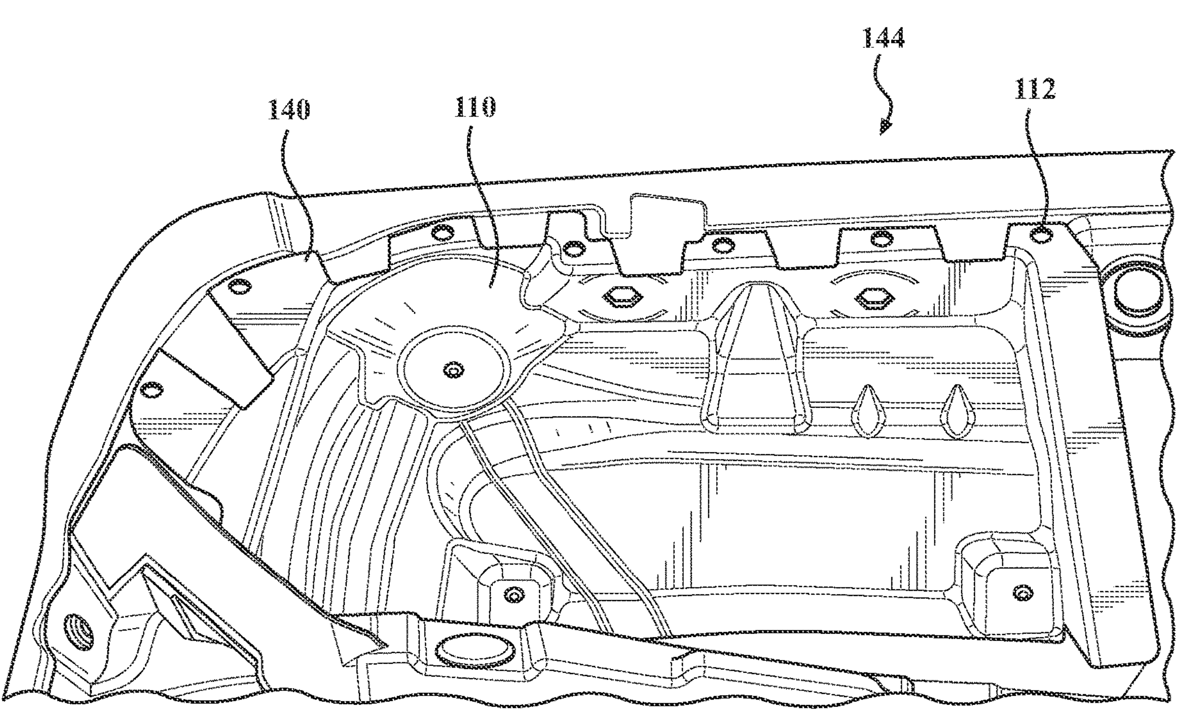
Figure 14:
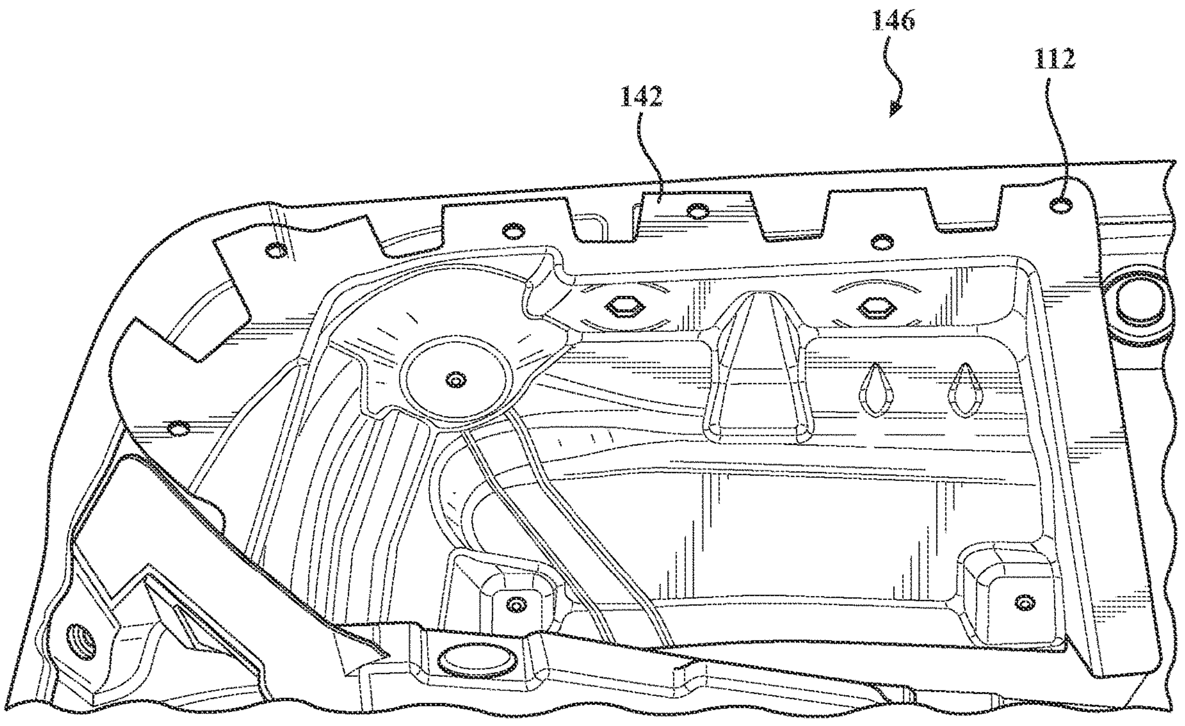

Referring more particularly to FIGS. 6-7, which is understood to be subtantially identical to the figures and description of FIGS. 1-5 and with like numbers, as further described above, with additionally there is illustrated the liftgate 100 with an exemplary header profile with a bump-out 120 (or cutout profile) in the second panel 104 that corresponding protruding adhesive portion 122 can flow into and held within.

Referring more particularly to FIGS. 8-14 and 16-20, there is illustrated exemplary reinforcements 110 with exemplary shaped apertures 112 (e.g., circular, pentagon, rectangular, oval, slotted, oblong, and any combinations thereof) at predetermined locations through the reinforcement 110 and exemplary patterns (e.g., patterns 130, 132, 134, 136, 138. FIGS.. 13 and 14 additionally illustrate a plurality of flanges 140, 142 on the reinforcement 110 arranged in predetermined patterns 144, 146, through which flanges 140, 142 the apertures 112 extend (and e.g., plurality of flanges 148 in FIG. 17 including at least one aperture 112 through each flange along the edge).

Figure 15:
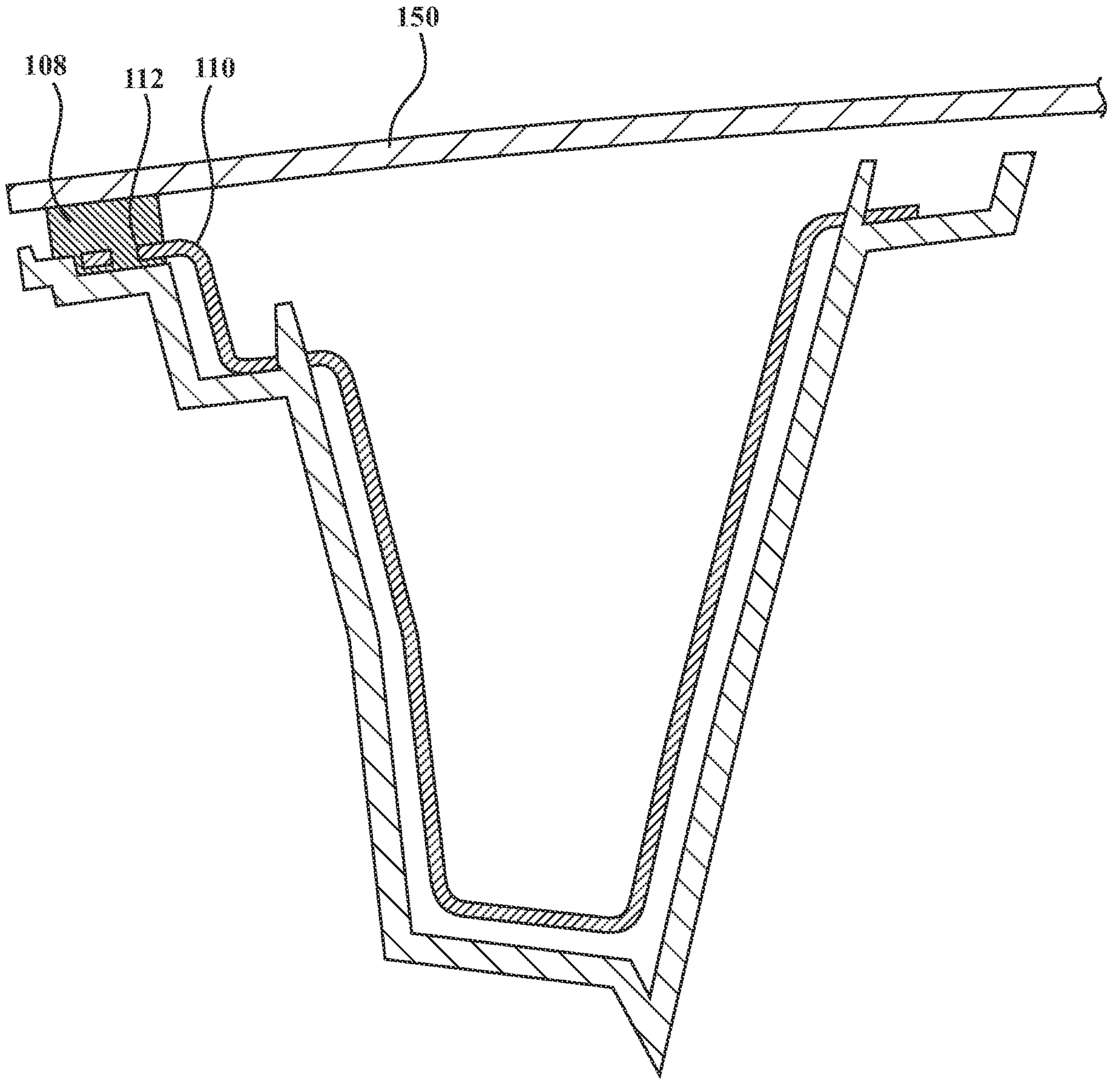
FIG. 15 is a cross section taken from a D-Pillar area of an exemplary liftgate depicting reinforcement bonded to panels, in accordance with the present invention.

Referring more particularly to FIG. 15, there is illustrated an exemplary cross section taken at a D-pillar area of the liftgate. Rather than the adhesive only adhering to panels (e.g., thermoplasic panels), the adhesive 108 is shown bonded to a first panel 104 (e.g., outer panel) and the reinforcement 110, but also to a second panel 150 that is a window (e.g., glass pane, rear window panel).

Referring more particularly to FIGS. 16-20, there is included additional graphics showing that there can be varying predetermined trim line shapes and varying predetermined aperture shapes and patterns to support adhesive flow through and/or around the reinforcement 110, thus providing better bonding performance. It is understood that alternative trim line shapes hole patterns can be used operably suitable to support adhesive flow through and around the reinforcements depending on the applications without departure from the scope of the present invention. It is further understood that the reinforcements 110 are predetermined shapes and dimensions operably adapted depending on the particular applications without departure from the scope of the present invention. It is further understood that predetermined apertures 112 and any predetermined features are preferably formed in predetermined reinforcements 110 prior to molding or otherwise final shaping of the reinforcements 110 in the assembly.

Figure 16:
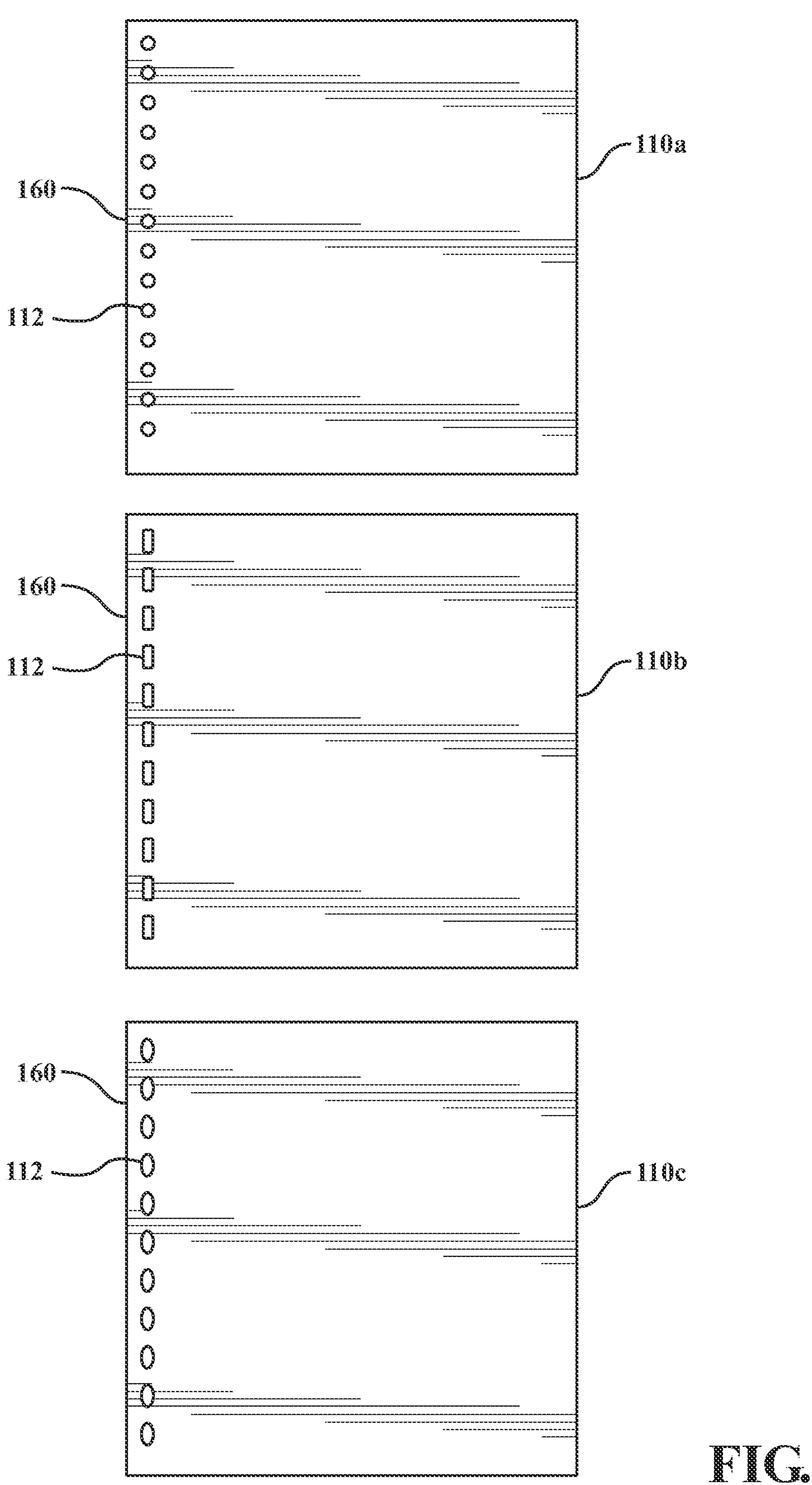
FIGS. 16-20 are exemplary apertures and patterns for reinforcements and bonding, in accordance with the present invention.

FIG. 16 depicts exemplary patterns for the adhesive bonding, in accordance with the present invention. There is illustrated at least one edge 160 that is continuous and a plurality of apertures 112 adjacent thereto. Each aperture 112 is preferably operably formed substantially the same distance from the continuous edge 160. An exemplary first sheet 110*a* depicts a continuous edge 160 and an exemplary plurality of apertures 112 that are substantially circular holes. An exemplary second sheet 110*b* depicts a continuous edge 160 and an exemplary plurality of apertures 112 that are substantially slot shaped, e.g., 4-sided slots extending lengthwise substantially along the same plane. An exemplary third sheet 110*c* depicts a continuous edge 160 and an exemplary plurality of apertures 112 that are substantially oval shaped, e.g., ovals extending lengthwise substantially along the same plane. Predetermined distances from edge(s) 160, alternative cross-sections, patterns, shapes, and dimensions, and any combinations thereof are contemplated depending on the application without departure from the scope of the present invention.

Generally, the distance between apertures 112 is about 3 to 25 millimeters. Typically, the distance between apertures 112 is about 3 to 10 millimeters. Preferably, the distance between apertures 112 is about 3 to 8 millimeters. More preferably, the distance between apertures 112 is about 5 millimeters. Greater or less distance is contemplated depending on the application without departure from the scope of the present invention.

Generally, the substantially slot-shaped and substantially oval-shaped apertures 112 are about 3 to 25 millimeters long. Typically, about 3 to 15 millimeters long. Preferably, about 4 to 10 millimeters long. More preferably, about 8 millimeters long. Greater or less length is contemplated depending on the application without departure from the scope of the present invention.

Generally, the substantially slot-shaped and substantially oval-shaped apertures 112 are about 3 to 25 millimeters wide. Typically, about 3 to 15 millimeters wide. Preferably, about 5 to 10 millimeters wide. More preferably, about 4-5 millimeters wide. Greater or less width is contemplated depending on the application without departure from the scope of the present invention.

Generally, the substantially circular-shaped apertures 112 are about 2 to 25 millimeters in diameter. Typically, about 2 to 15 millimeters in diameter. Preferably, about 3 to 10 millimeters in diameter. More preferably, about 5 millimeters in diameter. Greater or less in diameter is contemplated depending on the application without departure from the scope of the present invention.

Figure 18:
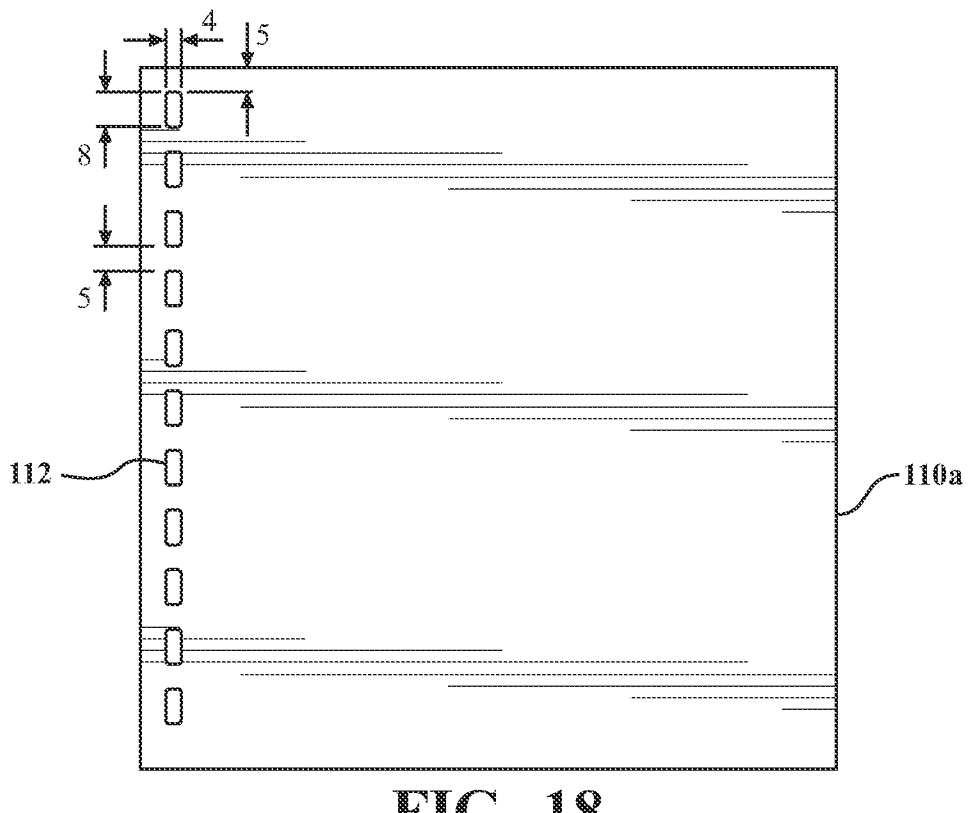
Figure 19:
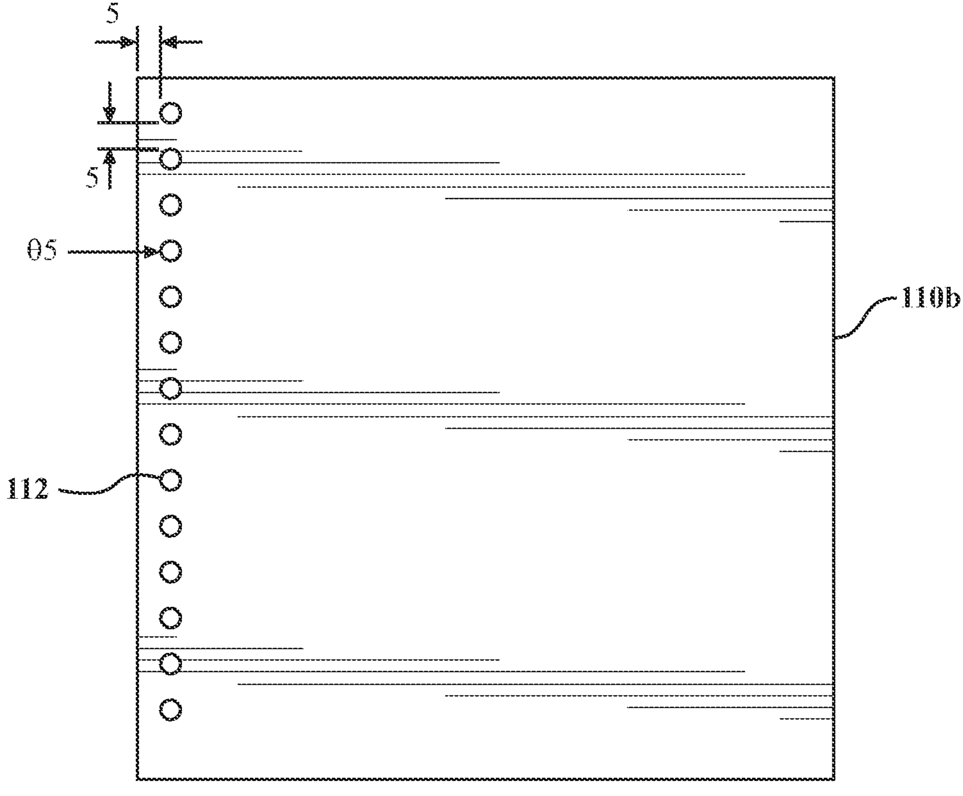
Figure 20:
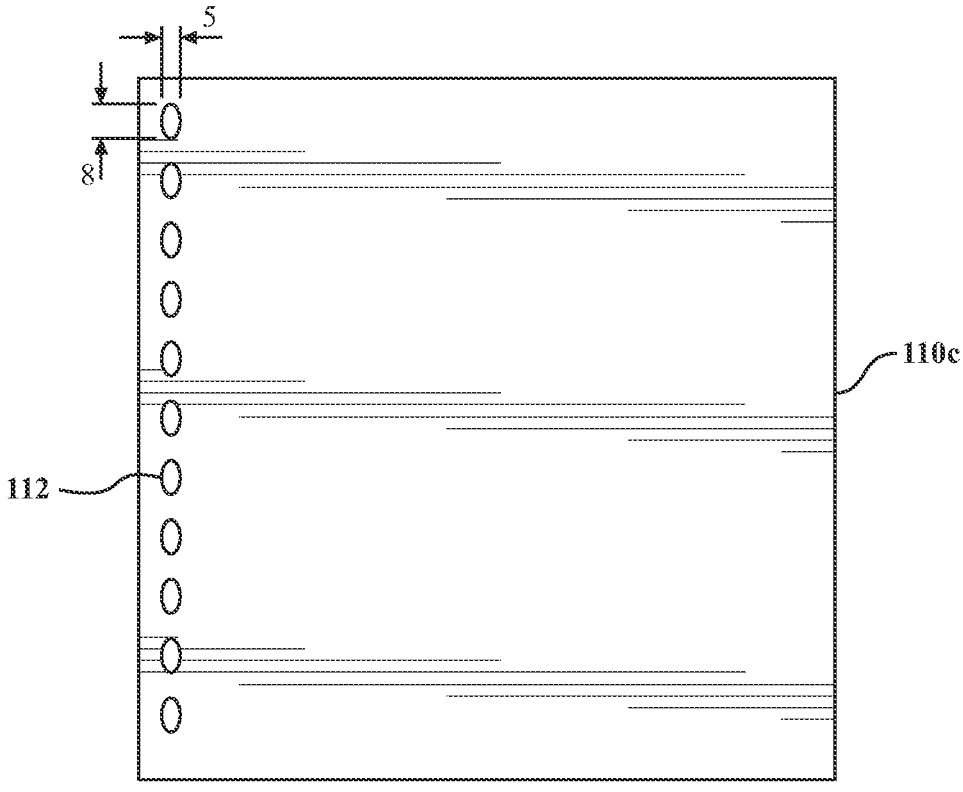

FIGS. 18-20 depict exemplary corresponding dimensions of exemplary sheets 110*a*-110*c*. Greater or less is contemplated without departure from the scope of the present invention. It is understood that any predetermined shapes, patterns, and dimensions are contemplated depending on the application without departure from the scope of the present invention. Furthermore, the more or less apertures 112, and combinations of shapes and patterns and edges, are contemplated depending on the application without departure from the scope of the present invention.

Figure 17:
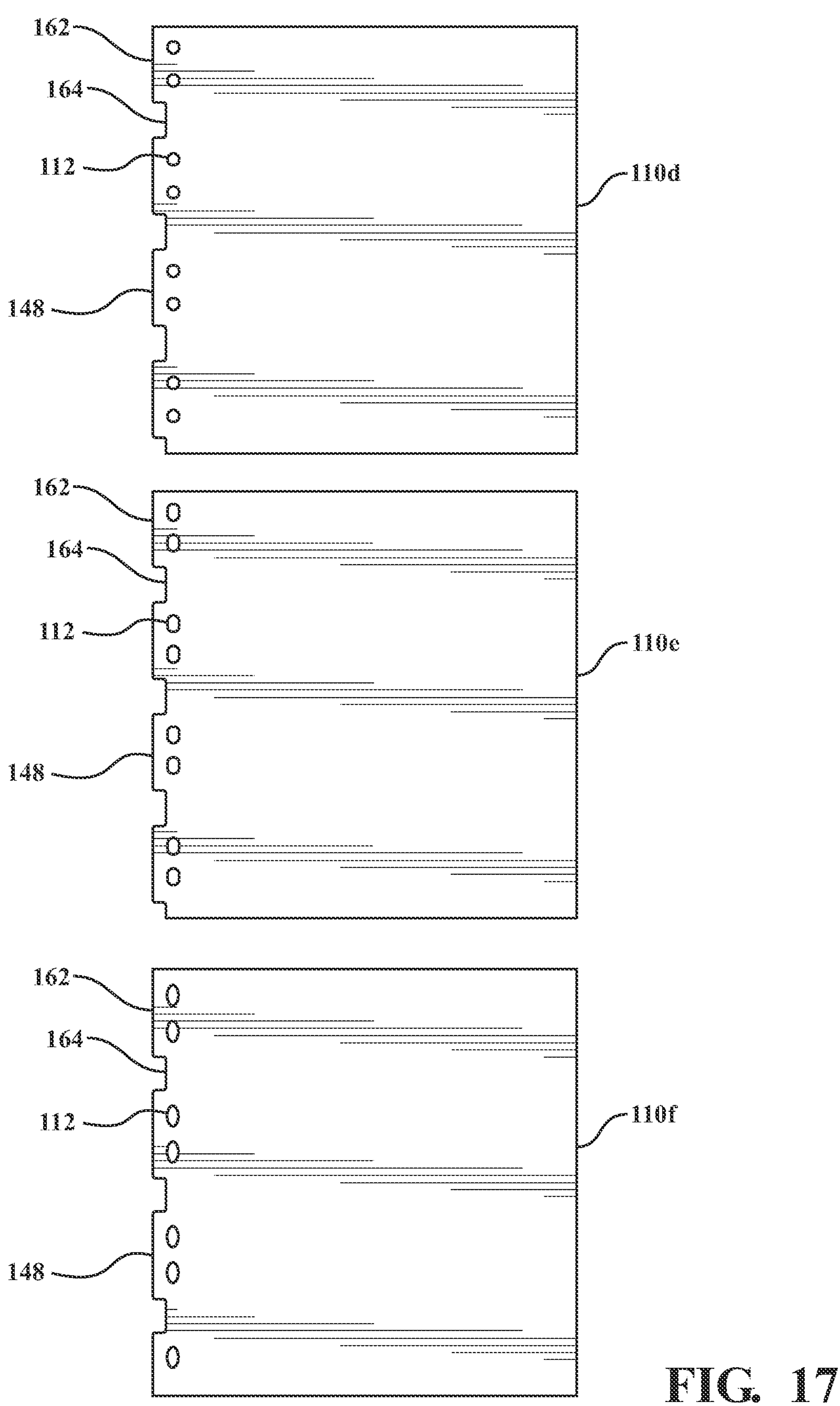

FIG. 17 depicts exemplary patterns for the adhesive bonding, in accordance with the present invention. There is illustrated at least one edge 162 that is non-continuous and a plurality of apertures 112 adjacent thereto. The edge 160 incorporates at least one slot 164. Preferably, a plurality of open slots 164 spaced along the edge 162, e.g., equal distance or different sized and/or spaced slots 164). Any suitable alternative predetermined slots or openings 164 and patterns are contemplated depending on the application without departure from the scope of the present invention. Each aperture 112 is preferably operably formed substantially the same distance from the edge 162. By way of example, apertures 112 are formed in flanges or tabs 148 located between adjacent open slot 164 portions. An exemplary fourth sheet 110*d* depicts an edge 162 that is non-continuous incorporating slots 164 and an exemplary plurality of apertures 112 that are substantially circular holes. An exemplary fifth sheet 110*e* depicts a non-continuous edge 162 with open slots 164 and an exemplary plurality of apertures 112 that are substantially slot shaped, e.g., 4-sided slots extending lengthwise substantially in-line along the same plane, alternatively, staggered off-line. An exemplary sixth sheet 110*f* depicts a non-continuous edge 162 with open slots 164 and an exemplary plurality of apertures 112 that are substantially oval shaped, e.g., ovals extending lengthwise substantially along the same plane. Alternative distances from edge(s), slots, tabs, alternative patterns, shapes, and dimensions, cross-sections, and any combinations thereof are contemplated depending on the application without departure from the scope of the present invention.

Figure 21:
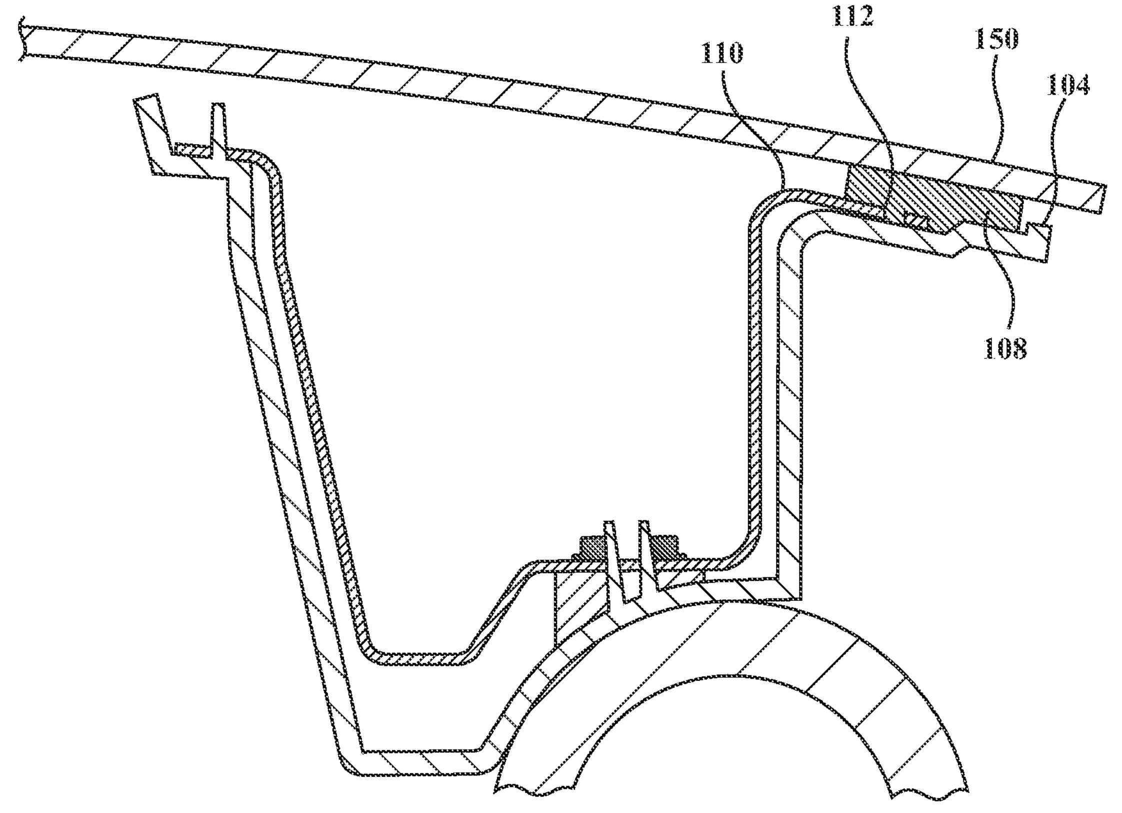
FIG. 21 is a cross section view where the adhesive is shown to flow through a hole and up to trim line, but the adhesive does not wrap all the way under the reinforcement, in accordance with an aspect of the present invention.

According to aspects of the present invention, adhesive may flow through the at least one aperture and up to at least one trim line, but the adhesive does not wrap all the way under at least one reinforcement (e.g., bracket). Referring more particularly to FIG. 21 there is depicted a sectional view depicting where the adhesive 108 is shown to flow through the aperture 112 and up to the trim line (e.g., stopping at a panel such as an inner panel 104), but the adhesive 108 does not wrap all the way under the bracket (e.g., reinforcement 110).

Referring to FIGS. 1-21, it is understood that any alternative shapes, profiles, patterns, cross sections, and configurations are contemplated depending on the application without departure from the scope of the present invention.

Referring to FIGS. 1-7, 15, and 21 generally, it is understood that the cross sections are exemplary and alternative panels, reinforcements, apertures, shapes thereof, and configurations are contemplated without departure from the scope of the present invention.

While a thermoplastic liftgate is shown and described, it is understood that the alternative material and any parts are contemplated without departure from the scope of the present invention, e.g., door panels, roofs, instrument panels, hoods, bumpers, front end modules, composite panels, tailgates, etc.

While inner and outer panels are shown and described, it is understood that any part is contemplated depending on the application without departure from the scope of the present invention.

It is understood that the metallic reinforcement can be any predetermined alternative material depending on the application without departure from the scope of the present invention, e.g., composite, fiber or glass reinforced plastics, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for bonding structure adapted for vehicles, comprising:

providing a plurality of parts to be bonded, including at least a first panel and a second panel, wherein one or both of the first panel and the second panel are plastic;

providing an adhesive;

providing a reinforcement that has multiple apertures, the reinforcement being formed of metal;

applying adhesive to the first panel at a plurality of locations;

aligning the reinforcement with the second panel;

aligning the adhesive at each location on the first panel with the apertures of the reinforcement;

bringing the first and second panels together, wherein said adhesive flows and allows the reinforcement to bond to the first and second panels, and to be captured through the apertures.

2. The method of claim 1, wherein the first panel and the second panel are thermoplastic.

3. The method of claim 1, wherein as the adhesive is flowing, the adhesive is squeezed around the reinforcement and through the apertures of the reinforcement so that the adhesive engages both the first panel and the second panel, and multiple edges of the reinforcement.

4. The method of claim 1, wherein the reinforcement is a header or D-pillar bracket.

5. The method of claim 1, wherein said adhesive flows through said apertures and up to a trim line of the reinforcement, but the adhesive does not wrap all the way to under the reinforcement.

6. The method of claim 1, wherein the adhesive wraps around the reinforcement substantially along an edge of the reinforcement.

7. The method of claim 1, wherein the adhesive flows through the apertures and is located above and below the reinforcement.

8. The method of claim 1, wherein the adhesive is located through the apertures and on only a first or second side of the reinforcement.

9. The method of claim 1, wherein the first panel and the second panel define a liftgate and the reinforcement is bonded to the first panel and the second panel at a header area of the liftgate.

10. The method of claim 1, wherein the apertures are slots and located adjacent to a substantially continuous edge of the reinforcement.

11. The method of claim 1, wherein apertures are provided in aperture pairs each located adjacent to tabs formed in a non-continuous edge of the reinforcement.

12. The method of claim 1, wherein the adhesive moves through the apertures and additionally around at least one edge of the reinforcement.

13. The method of claim 1, wherein said adhesive extends into at least two pockets formed in the first panel or the second panel, with one pocket located above and one pocket located below the reinforcement, to bond to said first and second panels.

14. The method of claim 1, wherein at least one of said first and second panels forms a header with a bump-out profile to receive adhesive flow.

15. The method of claim 1, wherein the reinforcement has a plurality of features including one or more of flanges, openings, notches, slots, holes, steps, and adhesive gaps in locations that will allow extra adhesive applied to the first panel that will allow the adhesive to flow around and through the reinforcement, so that the reinforcement is bonded to the first and second panels from multiple sides.

16. The method of claim 15, wherein the adhesive will also be mechanically captured through the openings, holes, or slots, and into undercut pockets formed in the first panel, second panel, and/or the reinforcement.

17. The method of claim 1, wherein the first or second panel is a rear glass window adapted for a vehicle.

18. A method for bonding structure adapted for vehicles, comprising:

providing at least an outer panel and an inner panel;

providing an adhesive;

providing a plurality of reinforcements each with a plurality of apertures and each formed of metal;

applying adhesive to the outer or inner panel at a plurality of locations operable to align with said plurality of apertures;

aligning the plurality of reinforcements with the outer or inner panel;

aligning the adhesive at each location on the other of the outer or inner panel to the plurality of apertures;

compressing the outer and inner panels together, wherein said adhesive flows and is captured through said plurality of apertures to bond the plurality of reinforcements to the outer and inner panels, without adding extra operations to connect the plurality of reinforcements to the outer panel to the inner panel.

19. A method for bonding structure adapted for vehicles, comprising:

providing at least an outer panel and an inner panel;

providing an adhesive;

providing a metallic reinforcement including a plurality of apertures that are spaced from an edge of the metallic reinforcement;

applying adhesive to said outer panel at locations;

loading said outer panel, the metallic reinforcement, and said inner panel into a tool with said adhesive at locations aligned with said plurality of apertures, wherein said adhesive flows to allow the metallic reinforcement to bond to said outer and inner panels and said adhesive is mechanically captured through said plurality of apertures, thereby adding reinforcement structure to the outer and inner panels without adding extra operations.

* * * * *